(12) United States Patent
Winkler

(10) Patent No.: US 9,431,180 B2
(45) Date of Patent: Aug. 30, 2016

(54) ENERGY STORAGE ARRANGEMENT

(75) Inventor: Josef Winkler, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 455 days.

(21) Appl. No.: 14/111,313

(22) PCT Filed: Jan. 27, 2012

(86) PCT No.: PCT/EP2012/000361
§ 371 (c)(1),
(2), (4) Date: Dec. 11, 2013

(87) PCT Pub. No.: WO2012/139675
PCT Pub. Date: Oct. 18, 2012

(65) Prior Publication Data
US 2014/0327298 A1 Nov. 6, 2014

(30) Foreign Application Priority Data

Apr. 12, 2011 (DE) .................. 10 2011 016 785
Jul. 22, 2011 (DE) .................. 10 2011 108 231

(51) Int. Cl.
*H01M 16/00* (2006.01)
*H01G 11/10* (2013.01)
(Continued)

(52) U.S. Cl.
CPC ............. *H01G 11/10* (2013.01); *B60L 3/0046* (2013.01); *B60L 3/04* (2013.01); *B60L 11/005* (2013.01); *B60L 11/1868* (2013.01); *B60L 11/1879* (2013.01); *B60R 16/033* (2013.01); *F02N 11/0866* (2013.01); *H01M 10/052* (2013.01); *H01M 10/0525* (2013.01); *H01M 10/12* (2013.01); *H01M 10/30* (2013.01); *H01M 10/345* (2013.01); *H01M 10/4264* (2013.01); *H01M 16/00* (2013.01); *H02J 7/1423* (2013.01); *H02J 7/34* (2013.01); *B60L 2240/545* (2013.01);
(Continued)

(58) Field of Classification Search
CPC ....................................................... H01M 16/00
USPC ........................................................... 307/9.1
See application file for complete search history.

(56) References Cited

U.S. PATENT DOCUMENTS 5,818,115 A 10/1998 Nagao
6,075,331 A 6/2000 Aldo et al.
(Continued)

FOREIGN PATENT DOCUMENTS

DE 43 40 350 A1 6/1995
DE 101 00 888 A1 7/2001
(Continued)

OTHER PUBLICATIONS

International Search Report issued by the European Patent Office in international Application PCT/EP2012/000361 on Aug. 11, 2012.
(Continued)

*Primary Examiner* — Robert Deberadinis
(74) *Attorney, Agent, or Firm* — Henry M. Feiereisen LLC

(57) ABSTRACT

An energy storage arrangement includes at least two rechargeable energy storage devices connected in parallel. A first energy storage device has a plurality of lead-based storage elements, and a second energy storage device has a plurality of lithium-based storage elements. Between charge state limits of 0 to 100% a charge state interval is achieved in which the nominal voltage of the second energy storage device is in a range between the maximum charging voltage and the nominal voltage of the first energy storage device.

27 Claims, 6 Drawing Sheets

(51) Int. Cl.

| | | |
|---|---|---|
| *B60L 3/00* | (2006.01) | |
| *B60L 3/04* | (2006.01) | |
| *B60L 11/00* | (2006.01) | |
| *B60L 11/18* | (2006.01) | |
| *F02N 11/08* | (2006.01) | |
| *H01M 10/052* | (2010.01) | |
| *H02J 7/14* | (2006.01) | |
| *H02J 7/34* | (2006.01) | |
| *B60R 16/033* | (2006.01) | |
| *H01M 10/34* | (2006.01) | |
| *H01M 10/30* | (2006.01) | |
| *H01M 10/0525* | (2010.01) | |
| *H01M 10/12* | (2006.01) | |
| *H01M 10/42* | (2006.01) | |

(52) U.S. Cl.
CPC ...... *F02N 11/087* (2013.01); *F02N 2011/0885* (2013.01); *H01M 2220/20* (2013.01); *Y02E 60/122* (2013.01); *Y02E 60/124* (2013.01); *Y02T 10/7005* (2013.01); *Y02T 10/7011* (2013.01); *Y02T 10/7022* (2013.01); *Y02T 10/7066* (2013.01)

(56) References Cited

U.S. PATENT DOCUMENTS

| | | |
|---|---|---|
| 6,366,055 B1 | 4/2002 | Ookoshi et al. |
| 2002/0167297 A1 | 11/2002 | Nozu et al. |
| 2004/0140139 A1 | 7/2004 | Malik |
| 2006/0127704 A1 | 6/2006 | Raiser |
| 2006/0197496 A1 | 9/2006 | Iijima et al. |
| 2007/0018501 A1 | 1/2007 | Schon et al. |
| 2007/0108946 A1* | 5/2007 | Yamauchi ............ H01M 10/42 320/132 |
| 2007/0170896 A1 | 7/2007 | Proebstle et al. |
| 2009/0081534 A1 | 3/2009 | Takami et al. |
| 2009/0200991 A1 | 8/2009 | Yoshida et al. |
| 2010/0072946 A1 | 3/2010 | Sugano |
| 2010/0090626 A1 | 4/2010 | King |
| 2011/0001352 A1* | 1/2011 | Tamura ................ B60R 16/033 307/9.1 |
| 2011/0012424 A1 | 1/2011 | Wortberg et al. |
| 2012/0056477 A1 | 3/2012 | Herges et al. |
| 2012/0074775 A1 | 3/2012 | Winkler et al. |

FOREIGN PATENT DOCUMENTS

| | | |
|---|---|---|
| DE | 10 2004 038 527 A1 | 3/2006 |
| DE | 10 2005 034 036 A1 | 1/2007 |
| DE | 10 2006 002 985 A1 | 8/2007 |
| DE | 11 2005 003 104 T5 | 10/2007 |
| DE | 10 2006 048 872 | 5/2008 |
| DE | 10 2006 048 872 A1 | 5/2008 |
| DE | 10 2007 050 103 A1 | 4/2009 |
| DE | 10 2007 062 955 A1 | 7/2009 |
| DE | 10 2008 014 346 A1 | 9/2009 |
| DE | 10 2009 019 531 A1 | 12/2009 |
| DE | 11 2008 000 980 T5 | 2/2010 |
| DE | 10 2009 044 211 A1 | 4/2010 |
| EP | 1 138 554 A2 | 10/2001 |
| EP | 1 257 036 A2 | 11/2002 |
| EP | 1 424 494 A1 | 11/2002 |
| EP | 1 811 629 A1 | 7/2007 |
| EP | 2 079 147 A1 | 7/2009 |
| EP | 2 272 722 A2 | 1/2011 |
| WO | WO2010/089113 A1 | 8/2010 |

OTHER PUBLICATIONS

Rainer Jung "Bordnetzmanagement für Mehrbatterien-Systeme" (Management of on board electrical system for multi-battery systems, technik profi 26/2006, p. 7-11.

* cited by examiner

ENERGY STORAGE ARRANGEMENT

CROSS-REFERENCES TO RELATED APPLICATIONS

This application is the U.S. National Stage of International Application No. PCT/EP2012/00361, filed Jan. 27, 2011, which designated the United States and has been published as International Publication No. WO 2012/139675 and which claims the priority of German Patent Application, Serial No. 10 2011 016 785.4, filed Apr. 12, 2011, and German Patent Application, Serial No. 10 2011 108 231,3, filed Jul. 22, 2011, pursuant to 35 U.S.C. 119(a)-(d).

BACKGROUND OF THE INVENTION

The invention relates to an energy storage arrangement with at least two rechargeable energy storage devices connected in parallel, wherein a first energy storage device includes a plurality of lead-based storage elements.

Energy storage systems having multiple parallel rechargeable energy storage devices are typically installed in modern motor vehicles, wherein a first energy storage is usually a lead-acid battery having several lead-based storage elements, also referred to as cells. A second energy storage device connected in parallel may be in the form of a capacitor, which generates, for example, the high currents required during starting of the motor vehicle. This is particularly advantageous when the high currents cannot be provided by the first energy storage device alone due to its low state of charge.

A fundamental problem with lead-based energy storage devices is the voltage drop as soon as a generator or battery charger from the power taken off or disconnected from the power grid. The voltage drop may in a typical lead-acid battery installed in a motor vehicle between a charging voltage of about 14 volts (V) during the charging process to a nominal voltage of about 12 volts amount when the charging current is removed. It is also disadvantageous with lead-based energy storage devices that they have a relatively low number of cycles, meaning that they can only be used for a comparatively small number of charging or discharging cycles. Both aspects have a negative impact on the overall performance of an energy storage arrangement based on lead-based energy storage devices. These problems equally apply to vehicles having a 24 volt onboard electrical system and vehicles having a 28 volt onboard electrical system, such as trucks or buses.

SUMMARY OF THE INVENTION

The present invention therefore addresses the problem to provide an improved energy storage arrangement.

The problem is solved by an energy storage device of the aforementioned type, which is characterized in that a second energy storage device includes a plurality of lithium-based storage devices, wherein a state of charge interval is defined between state of charge boundaries of 0 and 100%, wherein the nominal voltage of the second energy storage device is a range between the maximum charging voltage and the nominal voltage of the first energy storage device.

The present invention is based on the concept to connect a second energy storage device having a plurality of lithium-based energy storage elements in parallel with a first lead-based energy storage device. The invention hereby overcomes the parallel connection of two different types of energy storage devices which has been described in science and technology as disadvantageous. According to the invention, the second energy storage device is selected so as to have in a state of charge interval (of the second energy storage device) defined by the state of charge boundaries of 0 and 100% a nominal voltage located between the maximum charging voltage and the nominal voltage of the first energy storage device.

The energy storage device preferably forms part of an onboard electrical system of a motor vehicle wherein the onboard electrical system includes at least one generator, in particular for charging the first and second energy storage device and optionally further energy storage devices, and at least one load consuming electric power. Although the energy storage device can of course also be used in other technical fields, the following discussion is limited mainly to the installation of the energy storage arrangement in a motor vehicle.

According to the invention, a second energy storage device, which has a relatively high cycle lifetime, which is a measure for the number of possible charging/discharging processes of the energy storage device, is connected in parallel with the first energy storage device, which has a comparatively low cycle lifetime. During the operation of the motor vehicle, the electrical loads connected to an onboard electrical system of the motor vehicle are mainly supplied via the second energy storage device. The first energy storage device is mainly used for starting the vehicle or a drive assembly associated therewith.

In this way, a discharge of the lead-based first energy storage device is to the greatest extent possible prevented, in particular in traction phase of the motor vehicle, i.e. in driving situations where the generator, which represents a part of the onboard electrical system and generates at least electric power, produces only a reduced voltage, since, in these situations the corresponding required amount of energy is provided by the second lithium-based energy storage device. This is hereby due to the comparatively higher nominal voltage of the second energy storage device in these situations In coasting phases of the motor vehicle, i.e. in driving situations where the generator produces an increased voltage, the lithium energy storage device can be charged more than the lead energy storage device, which is in a higher state of charge and therefore dissipates less power. Of course, a suitable control device is provided which can ensure, for example, that the first energy storage device does not fall below a predefinable or predefined minimum state of charge, for example of 80%.

The energy storage device of the present invention thus provides a longer service life, in particular in absolute terms, of the first energy storage device. This will be illustrated by the following exemplary comparison.

Typically, the service life of a lead-based energy storage device in about 300 times its capacity, while the service life of a lithium-based energy storage device is at least 3000 times its capacity. With small discharge cycles, the service life of a lithium-based energy storage device can correspond to up to 20,000 times its capacity.

In an exemplary embodiment of the invention, the maximum charging voltage of the first energy storage device is about 15 volts and the nominal voltage of the first energy storage device is about 12 volts, so that the nominal voltage of the second energy storage device in state of charge boundaries between 0 and 100% may be in a range between about 12 volt and about 15 volts. These voltages apply to motor vehicles with a 12 volt onboard electrical system. For vehicles with a 24 volt onboard electrical system, the charging voltage of the first energy storage device is about 30 volts and its nominal voltage about 24 volts.

The aforementioned state of charge intervals may be defined more narrowly within the state of charge boundaries of 0 to 100%, so that a state of charge interval within the state of charge boundaries of 0 to 100% may also be between 20 and 80%, preferably between 40 and 60%, more preferably between 45 and 55%. In particular, when the second energy storage device has a charging state of 50%, its nominal charging voltage should be in a voltage range between the maximum charging voltage and the nominal voltage of the first energy storage device. Consequently, with the first energy storage device having in this example a maximum charging voltage of about 15 volts and a nominal voltage of about 12 volts, the nominal voltage of the second energy storage device should be, for example, between about 12 volt and about 15 volts in state of charge boundaries between 45 and 55%. The same applies to a 24 volt onboard electrical system with suitably adapted voltage values.

The storage elements forming the second energy storage device are preferably connected in series. Series circuits of identical storage elements are mostly known. It is then possible to adjust the voltage of the second energy storage device as a function of the number of series-connected storage elements to virtually any high value. Typically, the nominal voltages associated with the individual storage elements add up, so that the second energy storage device has a nominal voltage corresponding to the sum of the individual nominal voltages of the respective storage elements.

Several different exemplary embodiments of the second energy storage device will now be listed. This list is not exhaustive.

The second energy storage device may therefore include in an onboard electrical system designed for 12 volt: 6 storage elements based on lithium-titanate, or 4 storage elements based on lithium, or 3 storage elements based on lithium and 1 storage element based on a lithium-iron-phosphate compound, or 4 storage elements based on lithium-titanate and 1 storage element based on lithium, or 3 storage elements based on lithium-titanate and 2 storage elements based on lithium, or 3 storage elements based on titanate and 2 storage elements based on a lithium-iron-phosphate compound, or 2 storage elements based on lithium and 2 storage elements based on a lithium-iron-phosphate compound, or 3 storage elements based on lithium and 1 storage element based on lithium-titanate.

If the second energy storage device is configured for a 24 volt electrical system, the number of the aforedescribed storage elements doubles, while the possible combinations of different types of elements remain the same.

An additional embodiment of the second energy storage device suitable particularly for 24 volts onboard electrical systems may include: 7 storage elements based on lithium, or 7 storage elements based on lithium and 1 storage element based on lithium-titanate, or 6 storage devices based on lithium, and 2 storage elements based on lithium-titanate, or 11 storage elements based on lithium-titanate.

The second energy storage device may include, in addition to the plurality of lithium-based storage elements, at least one capacitor, in particular a double-layer capacitor. Double layer capacitors have two electrodes, between which an electrically conductive electrolyte is disposed. When an electric voltage is applied, ions of the electrolyte of opposite polarity collect at the electrodes, forming a charge carrier layer of immobile charge carriers. The electrodes with the charge carrier layer as a dielectric behave as two capacitors connected in series across the electrolyte. They store energy, unlike electrochemical energy storage devices, electrostatically. Double-layer capacitors typically have a small internal resistance and a high number of possible charging and discharging cycles.

Advantageously, the capacitor is as an additional storage element connected in series with the plurality of lithium-based storage elements. Thus, the nominal voltage of the second energy storage device can be further increased. Of course, it is also possible to connect more than one capacitor in series downstream of the storage elements of the second energy storage device.

If the second energy storage device includes at least one capacitor connected in series with the lithium-based storage elements, the following exemplary embodiments of the second energy storage device are preferred. The second energy storage device for a 12 Volt onboard electrical system thus advantageously includes: 5 storage elements based on lithium-titanate and 1 capacitor, in particular a double-layer capacitor, or 4 storage elements based on a lithium-iron-phosphate compound and 1 capacitor, in particular a double-layer capacitor. Here, too, the respective number of elements is doubled when the second energy storage device is designed for the 24 volt onboard electrical system.

Advantageously, a diode, in particular a quasi diode, is connected between the first and the second energy storage device. The forward direction of the diode is preferably in direction of the second energy storage device, i.e. energy (current) can flow via the first energy storage in the direction of the second energy storage device. Accordingly, the diode does not permit energy flow (current flow) from the second lithium-based energy storage device toward the first lead-based energy storage device (reverse direction of the diode). In certain circuit arrangements or situations, the diode may be bypassed so as to allow energy flow (current flow) also in the direction of the first energy storage device. This applies especially to a startup or an emergency start of a motor vehicle.

Advantageously, an electrical switching means, in particular a safety switch, may be connected between the first and the second energy storage device. The electrical switching means is, for example, an overvoltage protection and/or an undervoltage protection and/or a temperature protection. The electrical switching means may be in the form of a residual current circuit breaker. It is conceivable that the electrical switching means can be switched by a suitable control device connected thereto.

BRIEF DESCRIPTION OF THE DRAWING

Further advantages, features and details of the invention will become apparent from the exemplary embodiments described hereinafter and with reference to the drawings, which show in.

DETAILED DESCRIPTION OF PREFERRED EMBODIMENTS

Figure 1:
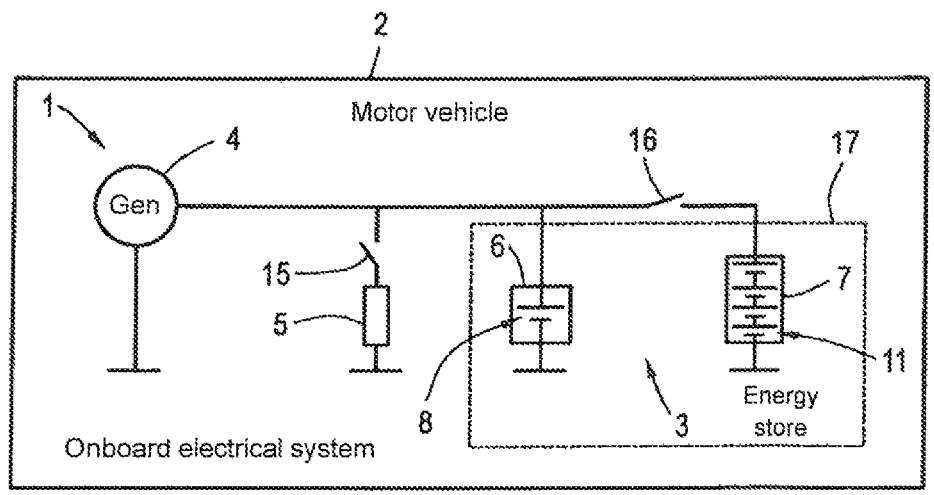
FIG. 1 a schematic diagram of an onboard electrical system of a motor vehicle according to an exemplary embodiment of the invention.

Fig. 1 shows a schematic diagram of an onboard electrical system 1 of a motor vehicle 2 according to an exemplary embodiment of the invention. An energy storage device 3, a generator 4, and at least one load 5 consuming electrical energy during operation, such as an air conditioner 5, is included in the onboard electrical system 1. The load can be disconnected from the onboard electrical system 2 by a switch 15. The energy storage device 3 includes two parallel-connected rechargeable energy storage devices 6, 7. The electrical connection between the energy storage devices 6, 7 can be disconnected by an electric switch 16. The switch 16 performs safety-related actions, such as in particular overvoltage protection, undervoltage protection and temperature protection. The supply voltage of the onboard electrical system 1 is about 13.5 to 15.5 volts.

The first energy storage device is provided as a lead battery and is accordingly formed of a plurality of series-connected lead-based storage elements 8 (cell). The maximum charging voltage of the first energy storage device 6 is approximately 15 volts (see FIG. 4, line 9), the nominal voltage of the first energy storage device 6 is approximately 12 volts (see FIG. 4, line 10). The second energy storage device 7 is embodied as a lithium battery and is formed, for example, of four series-connected lithium-based storage elements or cells 11. The nominal voltage of the second energy storage device 7 formed of four series-connected lithium-based storage elements 11 (see FIG. 4, line 12) is located within a state of charge interval of the second energy storage device 7 between 5 and 90%, located between defined state of charge boundaries of 0 and 100%, between the maximum charging voltage (see FIG. 4, line 9) and the nominal voltage (see FIG. 4, line 10) of the first energy storage device 6.

Figure 4:
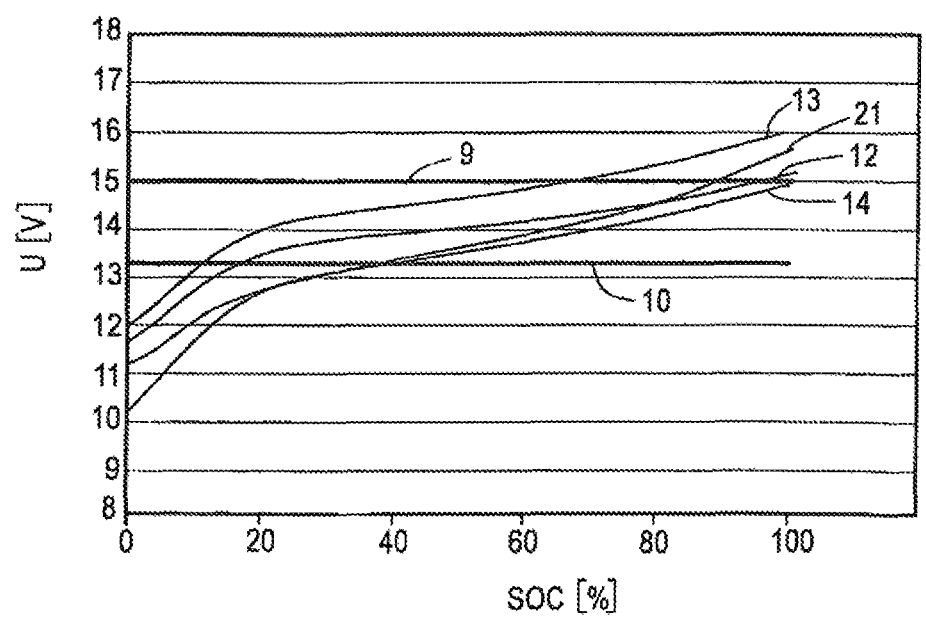
FIG. 4 a diagram showing the course of the battery voltage UV as a function of the state of charge SOC of different inventive embodiments of a second energy storage device.

The second energy storage device 7 could also be formed of six series-connected storage elements 11 of lithium-titanate (see FIG. 4, line 13). In this case, the nominal voltage of the second energy storage device 7 would be located within a state of charge interval of the second energy storage device 7 located within a state of charge interval of the second energy storage device 7 between 20 and 65%, located between defined state of charge boundaries of 0 and 100%, in a range between the maximum charging voltage (see FIG. 4, line 9) and the nominal voltage (see FIG. 4, line 10) of the first energy storage device 6. The use of lithium-titanate-based storage elements 11 is advantageous with respect to the safety of the second energy storage device 7 since these have, in particular, comparatively high thermal stability.

Likewise, the second energy storage device 7 could also be formed of three series-connected lithium-based storage elements 11 and one lithium-titanate based storage element 11 connected in series (see FIG. 4, line 14). In this case, the nominal voltage of the second energy storage means 7 would be located within a state of charge interval between 40 and 100%, located between defined state of charge boundaries of 0 and 100% of the second energy storage device 7, in a range between the maximum charging voltage (see FIG. 4, line 9) and the nominal voltage (see FIG. 4, line 10) of the first energy storage device 6.

Accordingly, the second energy storage device 7 can be constructed in many different ways. They have in common that their nominal voltage is in a state of charge interval located within a state of charge interval of the second energy storage device 7 between 40 and 60%, located between defined state of charge boundaries of 0 and 100%, in a range between the maximum charging voltage (see FIG. 4, line 9) and the nominal voltage (see 4, line 10) of the first energy storage device 6. In principle, a very slight increase in the nominal voltage of the second energy storage device 7 within the state of charge boundaries of 0 and 100% is desired, i.e. the nominal voltage of the second energy storage device 7 should in principle be located across a wide state of charge interval between maximum charging voltage (see FIG. 4, line 9) and the nominal voltage (see FIG. 4, line 10) of the first energy storage device 6.

As indicated by the dashed box 17, the energy storage arrangement 3, i.e. the first and the second energy storage device 6, 7, may be arranged in a common housing. This provides a particularly compact, easily maneuverable and lightweight embodiment of the energy storage device 3.

Basically, the first energy storage device 6 is used mainly for starting the motor vehicle 1, since high currents are typically required. In view of high cycling capability of the second energy storage device 7 compared to the first energy storage device 6, meaning that the second energy storage device 7 can be charged and discharged more frequently, the second energy storage device 7 is provided especially for the recuperation operation of the motor vehicle 1 and the generator 4, respectively. The second energy storage device 7 is mainly used in a so-called start-stop mode and a tracking mode of the motor vehicle 1. Optionally, a control device is provided which controls the switching-in or switching-out of the energy storage 6, 7 from the onboard electrical system 1.

The energy storage arrangement 3 according to the invention also improves acceleration of the vehicle, since the second energy storage device 7 takes over the supply of the onboard electrical system 1 at a low voltage reduction of the generator 4.

Figure 2:
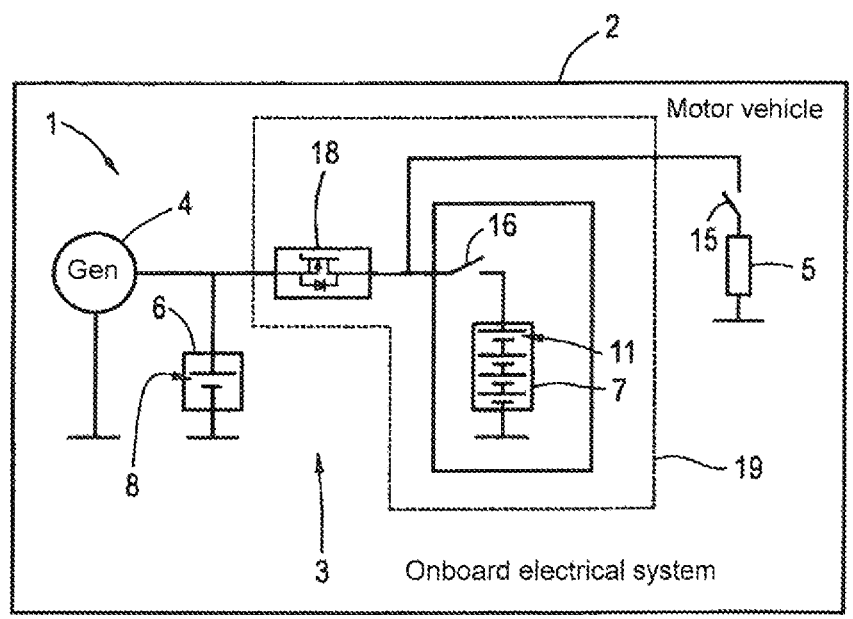
FIG. 2 a schematic diagram of an onboard electrical system of a motor vehicle according to an exemplary embodiment of the invention.

FIG. 2 shows a schematic diagram of an electrical system 1 of a motor vehicle 2 according to another exemplary embodiment of the invention. The major difference from the embodiment shown in FIG. 1 is the diode 18 connected between the first energy storage device 6 and the second energy storage device 7, which is in particular in the form of a quasi-diode. The forward direction of the diode 18 is in the direction of the second energy storage device 7. The diode 18 can be bypassed for the startup or for an emergency start of the motor vehicle. In this situation, power from the second energy storage device 7 can also be made available for starting the motor vehicle 1.

The dotted box 19 shows the possibility to integrate the diode 18, the switch 16 and the second energy storage device 7 in a common housing. It is also possible to integrate only the switch 15 and the diode 18 in a common housing.

Figure 3:
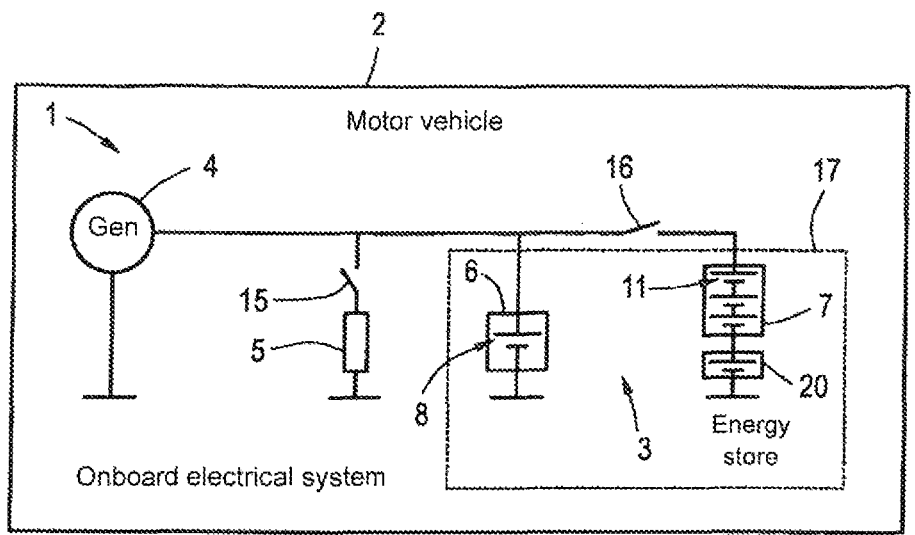
FIG. 3 a schematic diagram of an onboard electrical system of a motor vehicle according to an exemplary embodiment of the invention.

FIG. 3 shows a schematic diagram of an electrical system of a motor vehicle 1 according to another exemplary embodiment of the invention. The main difference from the embodiments shown in FIGS. 1 and 2 is the design of the second energy storage device 7, which has in addition to three lithium-based storage elements 11 at least one capacitor 20. As can be seen, the capacitor 20 is connected in series with the storage elements 11. Accordingly, the electric capacity of the second energy storage device 7 can be increased. The capacitor 20 is advantageously a double-layer capacitor. The nominal voltage of the capacitor 20 is, for example, about 3 volts.

A series-connection of lithium-based storage elements 11 and a capacitor may also be formed, for example, of five lithium-titanate-based storage elements 11 and one double-layer capacitor (see FIG. 4, line 21). In this case, the nominal voltage of the second energy storage device 7 would be in a state of charge interval of the second energy storage device 7 located in a range between 15 and 85%, with reference to a defined state of charge boundaries of 0 and 100%, between the maximum charging voltage (see FIG. 4, line 9) and the nominal voltage (see FIG. 4, line 10) of the first energy storage device 6.

Figure 5:
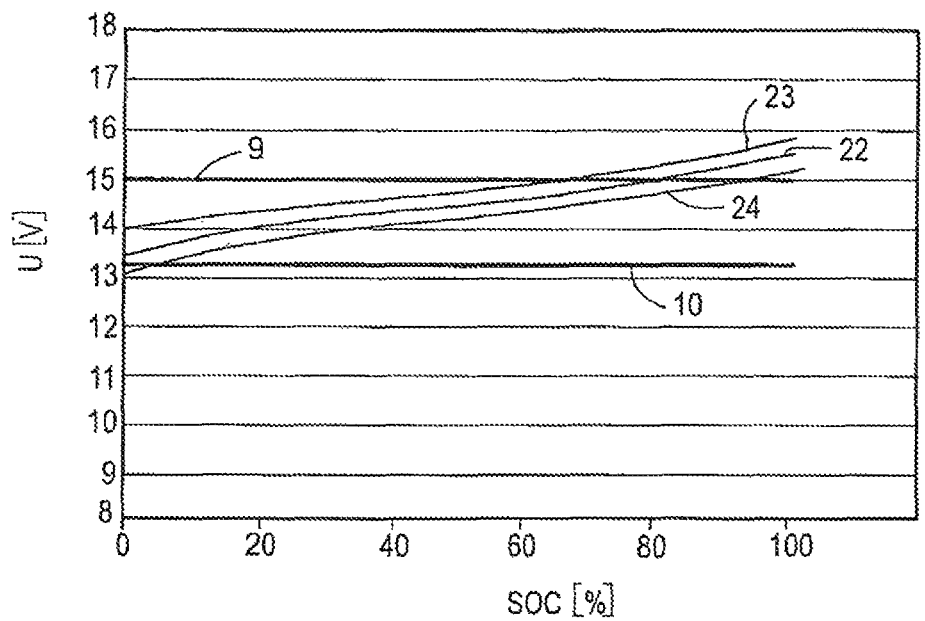
FIG. 5 a diagram showing the course of the battery voltage U as a function of the state of charge SOC of an exemplary embodiment of a second energy storage device according to the invention for different charge and discharge conditions.

FIG. 5 shows a diagram of the course of the battery voltage U as a function of the state of charge (SOC) of an exemplary embodiment of a second energy storage device 7 according to the invention, based on 6 series-connected lithium-titanate-based storage elements 11 for different charging or discharging conditions. It can be seen that it is desirable that the second energy storage device 7 has a course (see FIG. 5, line 10) as close as possible near the center between the maximum charging voltage (see FIG. 5, line 9) and the nominal voltage of the first energy storage device 6 (FIG. 5, line 22), because in this case the curve of the nominal voltage of the second energy storage means 7 in both a charging state (see FIG. 5, line 23) and in a discharging state (see FIG. 5, line 24) is located in a widest possible state of charge interval between the maximum charging voltage (see FIG. 5, line 9) and the nominal voltage (see FIG. 5, line 10) of the first energy storage device 6.

Figure 6:
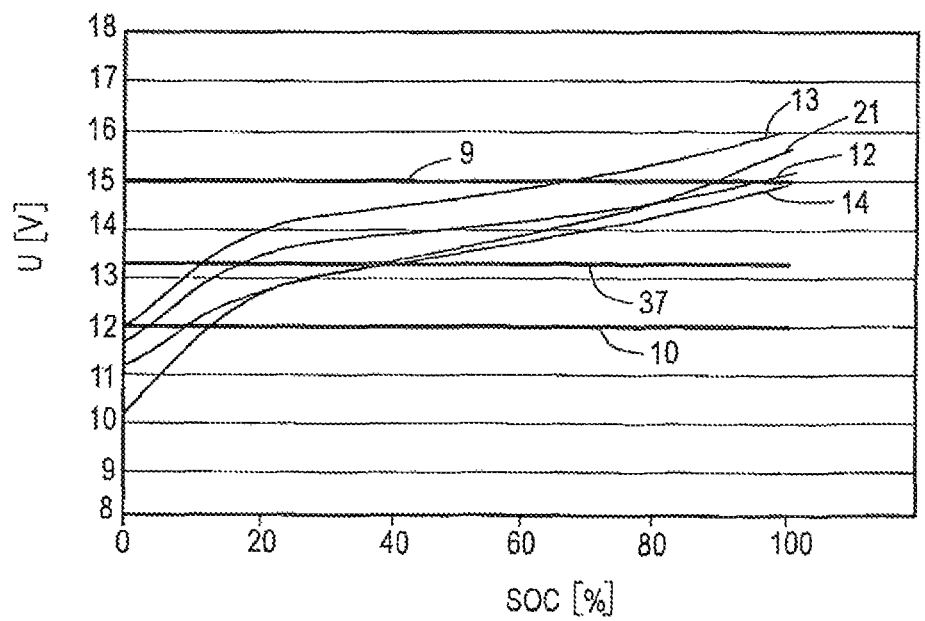
FIG. 6 a diagram showing the course of the battery voltage U as a function of the state of charge SOC of different inventive embodiments of a second energy storage device.
Figure 7:
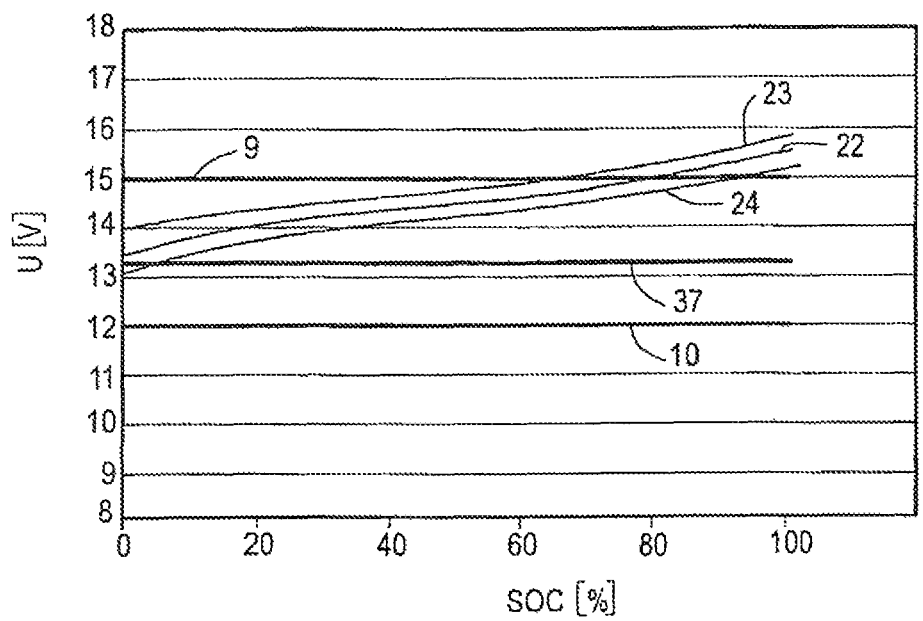
FIG. 7 a diagram showing the course of the battery voltage U as a function of the state of charge SOC of an exemplary embodiment of a second energy storage device according to the invention for different charge and discharge conditions, and FIGS. 8-11 additional diagrams showing the course of the battery voltage U as a function of the state of charge SOC of additional exemplary embodiments men of a second energy storage device according to the invention for different charge and discharge conditions.

The diagrams shown in FIGS. 6 and 7 correspond essentially to the diagrams shown in FIGS. 4 and 5, except that the nominal voltage of the first energy storage device 6 is in each case about 12 V (see FIGS. 6 and 7, line 10). Additionally, a line 37 relating to the minimum operating voltage of the first energy storage device 6 is shown, which is located for example at approximately 13 volts. As can be seen, the nominal voltage of the different embodiments of the second energy storage device 7 (FIG. 4, lines 12, 13, 14, 21) is located within a state of charge interval between 0 and 10%, respectively, and 100%, with reference to a defined state of charge boundaries of 0 and 100%, in a range between the maximum charging voltage (see FIG. 4, line 9) and the nominal voltage (see FIGS. 6 and 7, line 10) of the first energy storage device 6, and within a state of charge interval between 15 and 100%, with reference to a defined state of charge boundaries of 0 and 100%, between the maximum charging voltage (see FIGS. 6 and 7, line 10) and the minimum operating voltage (see FIGS. 6 and 7, line 37) of the first energy storage device 6. The same applies to the respective charging and discharging states (see FIG. 7, lines 23, 24) of the second energy storage device 7.

FIGS. 8-11 show diagrams of the course for the battery voltage U as a function of the state of charge SOC of additional exemplary embodiments of a second energy storage device 7 according to the invention for different charging and discharging conditions. The embodiments of the second energy storage device 7 shown in FIGS. 6-9 are particularly suitable for use of the energy storage arrangement 3 according to the invention as part of a 24-volt onboard electrical system 1 of a motor vehicle 2. The line 9 in FIGS. 8-11 also relates to the maximum charging voltage of the first energy storage device 6, the line 10 to the nominal voltage of the first energy storage device 6, and the line 37 to the minimum operating voltage of the first energy storage device 6.

Figure 8:
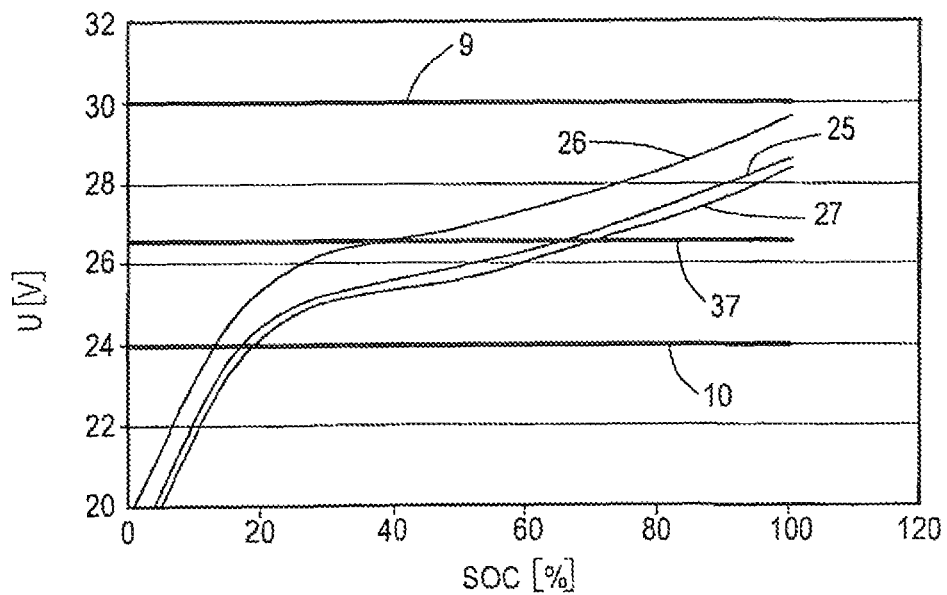

The embodiment shown in FIG. 8 relates to a second energy storage device 7 formed of 7 on lithium-based, series-connected storage elements 11. The course of the nominal voltage (see FIG. 8, line 25) of the second energy storage device 7 is in a state of charge interval of about 65 to 100% between the maximum charge voltage (see FIG. 8, line 9) and the nominal voltage (see FIG. 8, line 10) of the first energy storage device 6. The same applies to a charging process of the second energy storage device 7 (see FIG. 8, line 26) and a discharging process of the second energy storage device 7 (see FIG. 8, line 27).

Figure 9:
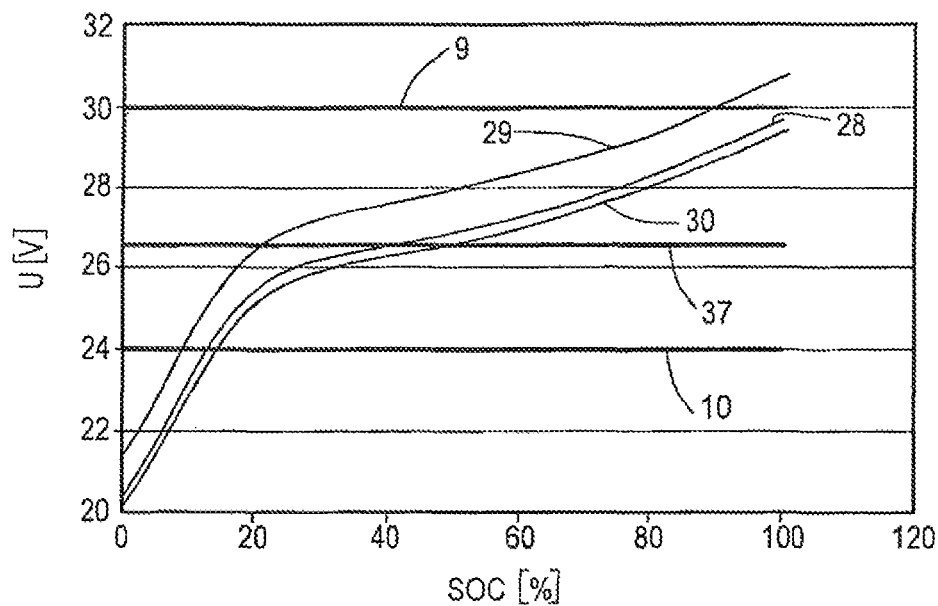

The embodiment shown in FIG. 9 relates to a second energy storage device 7 formed of 6 lithium-based and 2 lithium-titanate-based storage elements 11, wherein the storage elements 11 are once again connected in series. The nominal voltage (see FIG. 9, line 28) of a second energy storage device 7 of this design, as well as its nominal voltage during a charging process (see FIG. 9, line 29) and during a discharging process (see FIG. 9, line 30) is for a state of charge interval of about 50 to 90% between the maximum charging voltage (see FIG. 9, line 9) and the nominal voltage (see FIG. 9, line 10) of the first energy storage device 6.

Figure 10:
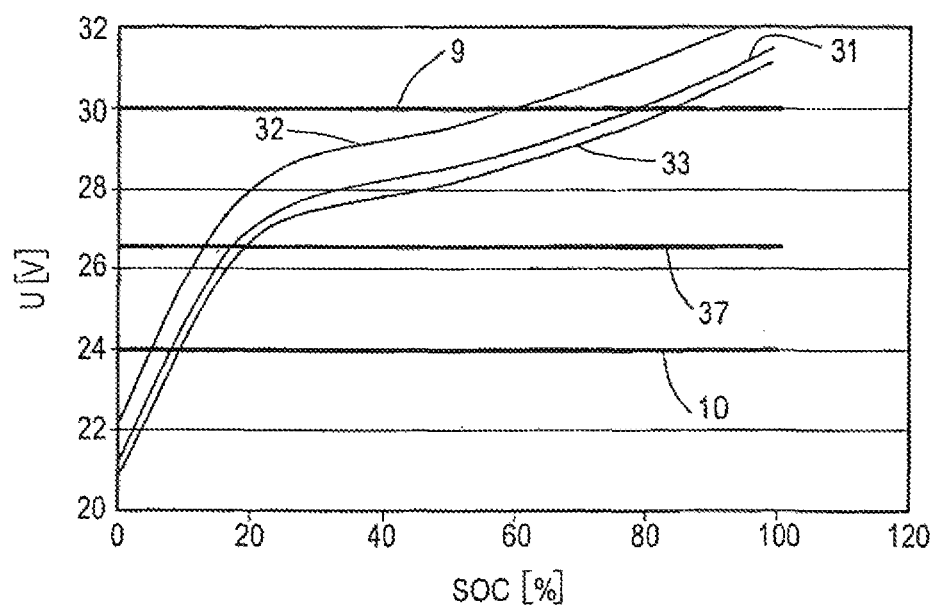

The same also applies to the embodiment of a second energy storage device 7 shown in FIG. 10, which is formed of 7 lithium-based storage elements 11 and 1 lithium-titanate-based storage element 11. Once again, the storage elements 11 forming the second energy storage 7 are connected in series. The state of charge interval, where the nominal voltage (see FIG. 10, line 31) is generally located in a charging process (see FIG. 10, line 32) and in a discharging process (see FIG. 10, line 33) between the maximum charging voltage (see FIG. 10, line 9) and the nominal voltage (see FIG. 10, line 10) of the first energy storage device 6, starts here already in a state of charge of 20% and ends at a state of charge of about 80%. In the charging process of the second energy storage device 7, the state of charge interval ends already at about 65%.

Figure 11:
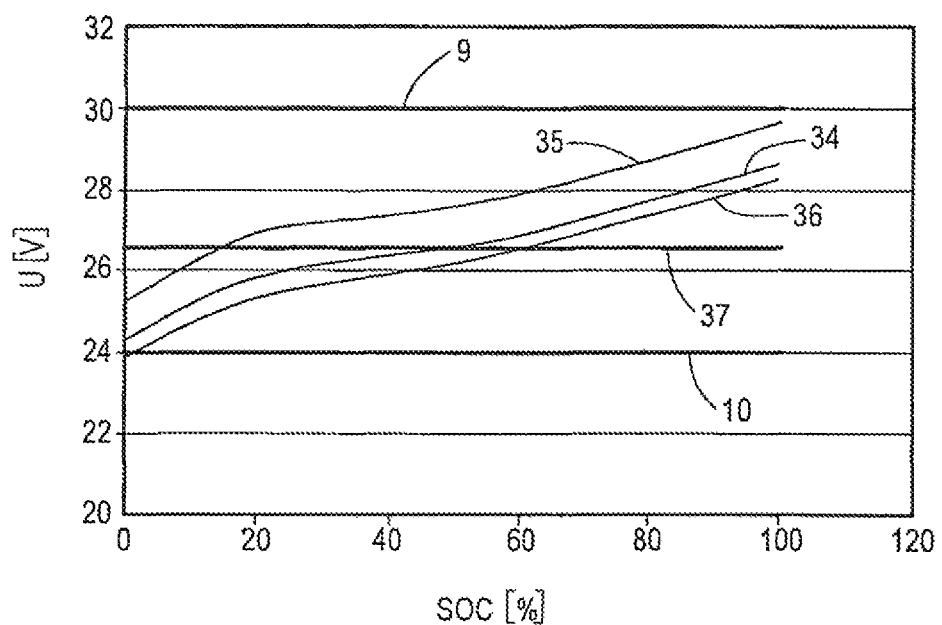

Lastly, FIG. 11 shows an embodiment of a second energy storage device 7 formed of 11 series-connected energy storage elements 11, each based on lithium. The nominal voltage (see FIG. 11, line 34) of this second energy storage device 7 is also located in a state of charge interval from about 55 to 100% between the maximum charging voltage (see FIG. 11, line 9) and the nominal voltage (see FIG. 11 line 10) of the first energy storage device 6. The same applies for a charging process (see FIG. 11, line 35) and a discharging process (see FIG. 11, line 36). In particular, the curve for the charging process advantageously shows over a state of charge interval ranging from about 20 to 100% a gently rising curve between the maximum charging voltage (see FIG. 11, line 9) and the nominal voltage (see FIG. 11, line 10) of the first energy storage device 6.

As can be seen, the nominal voltages of the second energy storage device 7 (see FIG. 8, line 25, FIG. 9, line 28, FIG. 10, line 31, FIG. 11, line 34) are also located within state of charge intervals of at least about 60 to 100% (see FIG. 8, Line 25) to state of charge intervals of about 15 to 100% (see FIG. 10, line 31), with reference to the defined state of charge boundaries of 0 to 100%, between the maximum charging voltage (see FIGS. 8-11, line 9) and the minimum operating voltage (see FIG. 8-11, line 37) of the first energy storage device 6. The same applies for charging and discharging processes of the embodiments shown in FIGS. 6-9 of the second energy storage device 7 (see FIG. 8, lines 26, 27, FIG. 9, lines 29, 30, FIG. 10, lines 32, 33, and FIG. 11, lines 35, 36).

The invention claimed is:

1. An energy storage arrangement, comprising:
a first rechargeable energy storage device comprising a plurality of lead-based storage elements,
a second rechargeable energy storage device comprising a plurality of lithium-based storage elements, at least one capacitor, the first and second rechargeable energy storage devices are connected in parallel,
wherein a state of charge interval is defined between state of charge boundaries of 0 and 100%, wherein a nominal voltage of the second energy storage device in the state of charge interval is in a range between a maximum charging voltage and a nominal voltage of the first energy storage device.

2. The energy storage arrangement of claim 1, wherein the state of charge interval is between a state of charge of 20% and 80%.

3. The energy storage arrangement of claim 1, wherein the state of charge interval is between a state of charge of 40% and 60%.

4. The energy storage arrangement of claim 1, wherein the state of charge interval is between a state of charge of 45% and 55%.

5. The energy storage arrangement of claim 1, wherein the lithium-based storage elements of the second energy storage devices are connected in series.

6. The energy storage arrangement of claim 1, wherein the plurality of lithium-based storage elements comprises at least one assembly selected from:
6 storage elements based on lithium-titanate,
4 storage elements based on lithium,
3 storage elements based on lithium and 1 storage element based on a lithium-iron-phosphate compound,
4 storage elements based on lithium-titanate and 1 storage element based on lithium,
3 storage elements based on lithium-titanate and 2 storage elements based on lithium,
3 storage elements based on titanate and 2 storage elements based on a lithium-iron-phosphate compound,
2 storage elements based on lithium and two storage elements based on a lithium-iron-phosphate compound, and
3 storage elements based on lithium and 1 storage element based on lithium-titanate.

7. The energy storage arrangement of claim 1, wherein the plurality of lithium-based storage elements comprises at least one assembly selected from:
7 storage elements based on lithium,
7 storage elements based on lithium and 1 storage element based on lithium-titanate,
6 storage elements based on lithium and two storage elements based on lithium-titanate, and 11 storage devices based on lithium-titanate.

8. The energy storage arrangement of claim 1, wherein the at least one capacitor is a double-layer capacitor.

9. The energy storage arrangement of claim 1, wherein the at least one capacitor is connected in series with the plurality of lithium-based storage elements.

10. The energy storage arrangement of claim 1, wherein the second energy storage device comprises at least 5 storage elements based on lithium-titanate and the at least one capacitor, or 4 storage elements based on a lithium-iron phosphate compound and the at least one capacitor.

11. The energy storage arrangement of claim 10, wherein the at least one capacitor is a double-layer capacitor.

12. The energy storage arrangement of claim 1, further comprising a diode connected between the first energy storage device and the second energy storage device.

13. The energy storage arrangement of claim 12, wherein the diode is a quasi-diode.

14. The energy storage arrangement of claim 1, further comprising an electrical switching device connected between the first energy storage and the second energy storage device.

15. The energy storage arrangement of claim 14, wherein the electrical switching device is a safety switch.

16. The energy storage arrangement of claim 1, wherein the energy storage arrangement forms part of an onboard electrical system of a motor vehicle, wherein the onboard electrical system comprises at least one generator and at least one load consuming electrical power.

17. The energy storage arrangement of claim 16, wherein the at least one generator charges the first energy storage device and the second energy storage device.

18. An energy storage arrangement, comprising:
a first rechargeable energy storage device comprising a plurality of lead-based storage elements,
a second rechargeable energy storage device comprising at least six lithium titanate storage elements, having a combined nominal voltage of 15V at a state of charge of 100%, and at least one capacitor coupled to the at least six storage elements,
wherein the first and second rechargeable energy storage devices are connected in parallel,
wherein a state of charge interval is defined between state of charge boundaries of 0 and 100%, wherein a nominal voltage of the second energy storage device in the state of charge interval is in a range between a maximum charging voltage and a nominal voltage of the first energy storage device.

19. The energy storage arrangement of claim 18, wherein the state of charge interval is between a state of charge of 20% and 80%.

20. The energy storage arrangement of claim 18, wherein the state of charge interval is between a state of charge of 40% and 60%.

21. The energy storage arrangement of claim 18, wherein the state of charge interval is between a state of charge of 45% and 55%.

22. The energy storage arrangement of claim 18, wherein the second rechargeable energy storage further comprises a capacitor.

23. The energy storage arrangement of claim 22, wherein the at least one capacitor is a double-layer capacitor.

24. The energy storage arrangement of claim 22, wherein the at least one capacitor is connected in series with the plurality of lithium-based storage elements.

25. The energy storage arrangement of claim 18, further comprising a diode connected between the first energy storage device and the second energy storage device.

26. The energy storage arrangement of claim 25, wherein the diode is a quasi-diode.

27. The energy storage arrangement of claim 18, further comprising an electrical switching device connected between the first energy storage and the second energy storage device.

\* \* \* \* \*